US011915717B2

(12) United States Patent
Sawada et al.

(10) Patent No.: US 11,915,717 B2
(45) Date of Patent: Feb. 27, 2024

(54) SIGNAL SEPARATION APPARATUS, SIGNAL SEPARATION METHOD AND PROGRAM

(71) Applicant: NIPPON TELEGRAPH AND TELEPHONE CORPORATION, Tokyo (JP)

(72) Inventors: Hiroshi Sawada, Musashino (JP); Rintaro Ikeshita, Musashino (JP); Nobutaka Ito, Musashino (JP); Tomohiro Nakatani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 451 days.

(21) Appl. No.: 17/292,529

(22) PCT Filed: Jul. 1, 2019

(86) PCT No.: PCT/JP2019/026019
§ 371 (c)(1),
(2) Date: May 10, 2021

(87) PCT Pub. No.: WO2020/100341
PCT Pub. Date: May 22, 2020

(65) Prior Publication Data
US 2021/0398549 A1 Dec. 23, 2021

(30) Foreign Application Priority Data
Nov. 12, 2018 (JP) ................. 2018-212408

(51) Int. Cl.
*G06F 17/16* (2006.01)
*G10L 21/0308* (2013.01)
*H04S 3/02* (2006.01)

(52) U.S. Cl.
CPC .......... *G10L 21/0308* (2013.01); *G06F 17/16* (2013.01)

(58) Field of Classification Search
CPC ....... G10L 21/0308; G06F 17/16; H04S 3/02; H04S 5/00
(Continued)

(56) References Cited

U.S. PATENT DOCUMENTS

2003/0061035 A1* 3/2003 Kadambe ............ G06F 18/2134
704/203

OTHER PUBLICATIONS

N. Q. K. Duong, E. Vincent, and R. Gribonval. "Under-determined reverberant audio source separation using a full-rank spatial covariance model." IEEE Transactions on Audio, Speech, and Language Processing 18.7 (Sep. 2010): 1830-1840.
(Continued)

*Primary Examiner* — George C Monikang
(74) *Attorney, Agent, or Firm* — IPUSA, PLLC

(57) ABSTRACT

The signal separation device includes: cross product calculation means receiving an input of an observed signal that is a mixture of a plurality of target signals, and calculating a cross product of the observed signal; model calculation means updating a parameter of a model for estimating the cross product with a predetermined algorithm using an inverse matrix of a matrix that represents an estimate of the cross product; inverse matrix calculation means calculating the inverse matrix of a matrix by a SIMD command when the parameter is updated; and separation means calculating the target signals using a matrix representing an estimate of the cross product, the updated parameter, and the observed signal.

9 Claims, 10 Drawing Sheets

(58) Field of Classification Search
USPC .................................. 381/17–23; 704/233
See application file for complete search history.

(56) References Cited

OTHER PUBLICATIONS

Hiroshi Sawada et al., "Multichannel extensions of non-negative matrix factorization with complex-valued data", IEEE Transactions on Audio, Speech, and Language Processing, vol. 21, No. 5, May 2013, pp. 971-982.

Mike Acton, "A 4x4 matrix inverse", literature, Jun. 3, 2006, https://cellperformance.beyond3d.com/articles/2006/06/a-4x4-matrix-inverse.html.

Li Zhou et al., "An implementation of MIMO detection in TD-LTE based on general purpose processor", 2012 7th International ICSTConference on Communications and Networking in China, Aug. 8, 2012, pp. 807-811.

\* cited by examiner

SIGNAL SEPARATION APPARATUS, SIGNAL SEPARATION METHOD AND PROGRAM

TECHNICAL FIELD

The present invention relates to a signal separation device, a signal separation method, and a program.

BACKGROUND ART

A method called blind signal separation, which belongs to the field of signal processing, is known. Blind signal separation is a method of separating a target set of source signals from a mixture signal observed with a plurality of sensors under a circumstance without the information about how the source signals were mixed.

One method, for example, based on a full-rank spatial covariance model is known to even allow separation of a larger number N of signal sources than the number M of sensors (see NPL 1). This method is explained below.

Observed signals of M sensors after frequency conversion are collectively represented as a vector.

$$x=[x_1, \ldots, x_M]^T \quad \text{[Formula 1]}$$

Vector x at discrete time t (hereinafter simply represented as "time t", too), which is the observed signal observed at each discrete time t, is represented as $x_t$. To allow handling of acoustic signals and wireless communication signals after frequency conversion, $x_t$ is assumed to be a complex vector. Here, the cross product of vector $x_t$ is as follows.

$$X_t = x_t x_t^H \quad \text{[Formula 2]}$$

Here, H represents a conjugate transpose.

The target source signals (hereinafter referred to also as "separated signals") are also represented as the following vector.

$$y=[y_1, \ldots, y_M]^T \quad \text{[Formula 3]}$$

Here, each element of this vector y is the source signal discretely observed with each of the M sensors. The separated signal of the n-th source signal at time t is expressed as $y_{nt}$.

According to the full-rank spatial covariance model, first, the number N of the signal sources is assumed, and the cross product $X_t$ mentioned above is approximated by the following expression.

[Formula 4]

$$\hat{X}_t = \sum_{n=1}^{N} A_n v_{nt} \quad (1)$$

Here, $A_n$ is a spatial covariance matrix that represents relative transfer from the n-th signal source to each sensor, and $v_{nt}$ is the power of the n-th signal source at time t. $v_{nt}$ is a non-negative value. In the text herein below, the hat symbol "^" that represents an approximation (or estimate) shall be placed immediately before a letter rather than at the top for the sake of convenience. For example, the approximation (or estimate) of $X_t$ shall be expressed as "^$X_t$". Since $A_n$ is assumed to be a Hermitian matrix, ^$X_t$ is also a Hermitian matrix.

A method based on an EM (Expectation-Maximization) algorithm is known as one method of estimating the parameters $A_n$ (n=1, ..., N) and $v_{nt}$ (n=1, ..., N, t=1, ..., T) of the full-rank spatial covariance model expressed by the equation (1) given above for the observed signal $x_t$ (t=1, ..., T).

According to the method based on the EM algorithm, assuming that the observed signal $x_t$ is decomposed to the form of:

[Formula 5]

$$x_t = \sum_{n=1}^{N} y_{nt}$$

and that the estimate ^$X_t$ of the cross product $X_t$ is decomposed to the form of:

[Formula 6]

$$\hat{X}_t = \sum_{n=1}^{N} \hat{Y}_{nt}$$

$$\hat{Y}_{nt} = A_n v_{nt}$$

an expected value of the cross product of $y_{nt}$ is calculated at an E-step as follows:

[Formula 7]

$$\mathbb{E}[y_{nt} y_{nt}^H] = \hat{Y}_{nt} + \hat{Y}_{nt}(\hat{X}_t^{-1} X_t \hat{X}_t^{-1} - \hat{X}_t^{-1})\hat{Y}_{nt} \quad (2)$$

and the parameters are updated at an M-step in accordance with the following expressions.

[Formula 8]

$$v_{nt} \leftarrow \frac{1}{M} tr(A_n^{-1} \mathbb{F}[y_{nt} y_{nt}^H]) \quad (3)$$

$$A_n \leftarrow \frac{1}{T} \sum_{t=1}^{T} \frac{1}{v_{nt}} \mathbb{F}[y_{nt} y_{nt}^H] \quad (4)$$

Here, tr represents the operator for determining the trace (i.e., the sum of the main diagonal elements) of the matrix.

To calculate the inverse matrix of the matrix ^$X_t$ in the equation (2) given above, for example, a built-in function inv( ) that calculates the inverse matrix of a single matrix is used to calculate:

$$\hat{X}_t^{-1} \leftarrow \text{inv}(\hat{X}_t) \quad \text{[Formula 9]}$$

consecutively from time t=1 to t=T.

Other than the EM algorithm described above, a MU (Multiplicative Update) algorithm is known. The V-update of the MU algorithm updates $v_{nt}$ in accordance with:

[Formula 10]

$$v_{nt} \leftarrow v_{nt} \sqrt{\frac{tr(\hat{X}_t^{-1} X_t \hat{X}_t^{-1} A_n)}{tr(\hat{X}_t^{-1} A_n)}} \quad (5)$$

while the A-update updates $A_n$ by sequentially carrying out the following expressions.

[Formula 11]

$$F = \sum_{t=1}^{T} \hat{X}_t^{-1} v_{nt}, \quad G = \sum_{t=1}^{T} \hat{X}_t^{-1} X_t \hat{X}_t^{-1} v_{nt}, \quad L \leftarrow chol(G) \quad (6)$$

Here, chol represents execution of Cholesky decomposition $LL^H = G$, which produces the result L that is a lower triangular matrix. After that, $A_n$ is updated in accordance with:

[Formula 12]

$$B = L^H A_n F A_n L, \quad A_n \leftarrow A_n L B^{-1/2} L^H A_n \quad (7).$$

Here,

[Formula 13]

$$-\tfrac{1}{2}$$

in the equation (7) above is the inverse matrix of the square root of the matrix, which can be calculated using eigenvalue decomposition. With this MU algorithm, too, the inverse matrix of the matrix $\hat{X}_t$ is calculated by the equation (5) and equation (6) given above.

By estimating the parameters $A_n$ and $v_{nt}$ of the full-rank spatial covariance model using the EM algorithm or MU algorithm, $\hat{X}_t$ and $\hat{Y}_{nt}$ are obtained. This allows for calculation of separated signals $y_{nt}$ for n=1, ..., N, t=1, ..., T by the following expression.

[Formula 14]

$$y_{nt} = \hat{Y}_{nt} \hat{X}_t^{-1} x_t \quad (8)$$

PRIOR ART LITERATURE

Non Patent Literature

[NPL 1] N. Q. K. Duong, E. Vincent, and R. Gribonval. "Under-determined reverberant audio source separation using a full-rank spatial covariance model." IEEE Transactions on Audio, Speech, and Language Processing 18.7 (2010): 1830-1840.

SUMMARY OF THE INVENTION

Technical Problem

According to the existing technique described above, the inverse matrices of matrices $\hat{X}_t$ and $A_n$ of size M×M are calculated by the equation (2) and equation (3) given above, or by the equation (5) and equation (6) given above. However, calculation of inverse matrices of matrices takes more time than calculation of reciprocals of scalars. The required time for calculation of the inverse matrix of matrix $\hat{X}_t$, in particular, when the number T of discrete time t increases, becomes dominant.

When handling broadband signals such as speeches and the like, signals of multiple frequencies need to be addressed simultaneously. For example, when a 6-second speech signal sampled at 8 kHz is analyzed with a window length of 128 ms and a shift length of 32 ms, the number of frequency bins will be 513 and the number of discrete times t will be T=201. This equals to, for example, calculation of the inverse matrix of the matrix $\hat{X}_t$ for 513×201×20=2,062,260 times in the case with using the EM algorithm of the existing technique described above in which the E-step and M-step are repeated 20 times. Accordingly, if performed with a common calculator, this calculation for processing the six-second speech may take an execution time of 10 seconds or more.

The present invention was made in view of the issue described above, with an object to reduce the time required for calculation of inverse matrices of matrices in blind signal separation.

Means for Solving the Problem

To achieve the above object, the signal separation device in one embodiment of the present invention includes: cross product calculation means receiving an input of an observed signal that is a mixture of a plurality of target signals, and calculating a cross product of the observed signal; model calculation means updating a parameter of a model for estimating the cross product with a predetermined algorithm using an inverse matrix of a matrix that represents an estimate of the cross product; inverse matrix calculation means calculating the inverse matrix of a matrix by an SIMD command when the parameter is updated; and separation means calculating the target signals using a matrix representing an estimate of the cross product, the updated parameter, and the observed signal.

Effects of the Invention

The time required for calculation of inverse matrices of matrices in blind signal separation can be reduced.

DESCRIPTION OF EMBODIMENT

Figure 1:
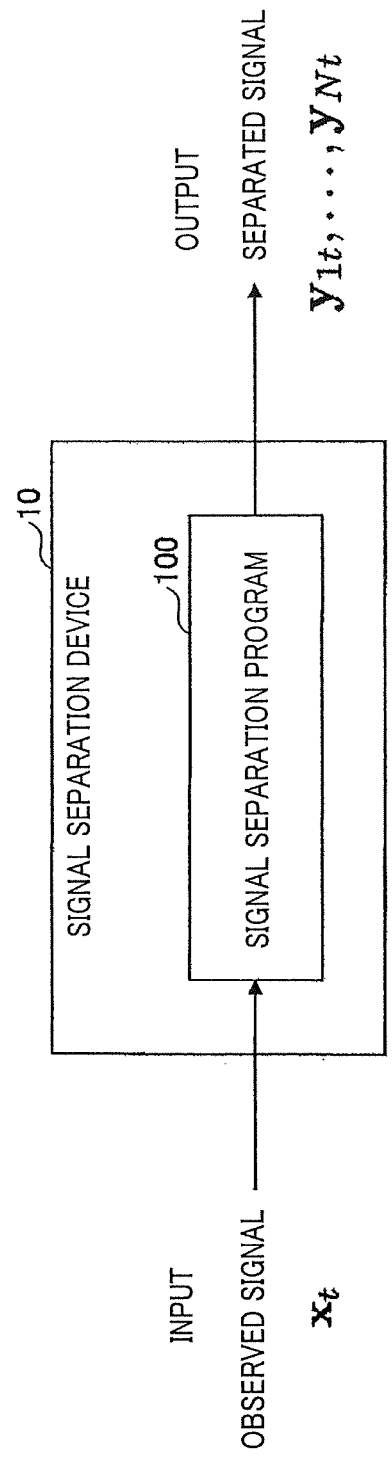
FIG. 1 is a diagram illustrating an example of an overall configuration of a signal separation device in one embodiment of the present invention.

Hereinafter, one embodiment of the present invention will be described. In the embodiment of the present invention, a signal separation device 10 that is able to reduce the time required for inverse matrix calculation of matrices in blind signal separation will be described. Signals in the embodiment of the present invention are not limited to particular types. Applicable signal types include, for example, acoustic signals (or speech signals), wireless signals, and the like.

<Overview of Inverse Matrix Calculation Method>

The signal separation device 10 in the embodiment of the present invention utilizes SIMD (Single Instruction Multiple Data) commands to speed up the inverse matrix calculation, i.e., to reduce the time required for calculation of inverse matrices of matrices. In the embodiment of the present invention, two methods of inverse matrix calculation, "Inverse Matrix Calculation Method 1" and "Inverse Matrix Calculation Method 2" will be described. Here, in the embodiment of the present invention, rather than using built-in functions or the like of a standard calculator or those already provided in a programing language or environment to calculate inverse matrices of matrices, calculation steps are designed in accordance with the inverse matrix calculation methods.

(Inverse Matrix Calculation Method 1)

First, Inverse Matrix Calculation Method 1 will be explained. The inverse $Q^{-1}$ of an M×M matrix Q can be calculated using a determinant detQ and an adjugate adj(Q) as shown in the equation (9) below. The adjugate is sometimes called the "adjoint", whose definition may sometimes differ. Here it is expressed as the "adjugate".

[Formula 15]

$$Q^{-1} = \frac{1}{\det Q} adj(Q) \quad (9)$$

The determinant detQ in this instance can be calculated by the "Determinant Calculation Method 1" or the "Determinant Calculation Method 2" below.

Determinant Calculation Method 1

The determinant detQ can be recursively calculated by the following.

[Formula 16]

$$\det Q = \sum_{m=1}^{M} (-1)^{m+1} [Q]_{m1} \det Q(\overline{m}, \overline{1})$$

Here, $[Q]_{mk}$ represents the elements (m, k) of the matrix Q.

$$Q(\overline{m}, \overline{k}) \quad \text{[Formula 17]}$$

is determined as the (M−1)×(M−1) matrix obtained by deleting the m-th row and k-th column of the matrix Q. The determinant of a 1×1 matrix (i.e., scalar) is the value itself of its unique element.

The adjugate adj(Q) is the transpose of the cofactor matrix C:

$$adj(Q) = C^T \quad \text{[Formula 18]}$$

where the cofactor matrix C of the matrix Q is an M×M matrix having the following elements (m, k).

$$[C]_{mk} = (-1)^{m+k} \det Q(\overline{m}, \overline{k}) \quad \text{[Formula 19]}$$

Determinant Calculation Method 2

Where q is a real number scalar, $$q \quad \text{[Formula 20]}$$

is a complex vector of dimension M−1, and $$Q \quad \text{[Formula 21]}$$

is an (M−1)×(M−1) Hermitian matrix, the determinant on the left side of the following equation (10) formed by these can be calculated by the right side of the equation (10) below by a theorem of block matrix determinants:

[Formula 22]

$$\det\begin{pmatrix} q & q^H \\ q & Q \end{pmatrix} = q \cdot \det S. \quad (10)$$

Here, $$S = Q - q^{-1}qq^H \quad \text{[Formula 23]}$$

(Inverse Matrix Calculation Method 2)

Next, Inverse Matrix Calculation Method 2 will be explained. The definitions of the symbols are similar to those of the "Determinant Calculation Method 2" of the "Inverse Matrix Calculation Method 1". The determinant here can be calculated by the following equation (11) in accordance with the theorem of block matrix determinants:

[Formula 24]

$$\begin{pmatrix} q & q^H \\ q & Q \end{pmatrix}^{-1} = \begin{pmatrix} q^{-1}(1 + q^{-1}q^H S^{-1}q) & -q^{-1}q^H S^{-1} \\ -q^{-1}S^{-1}q & S^{-1} \end{pmatrix}. \quad (11)$$

In the embodiment of the present invention, to utilize SIMD commands for the calculation of inverse matrices of matrices, a data structure with a collection of multiple matrices are used. For example, for calculating the inverse matrix of the matrix $\hat{X}_t$, a tensor of size M×M×T, containing T array elements of M×M matrices $\hat{X}_t$ (i.e., $\hat{X}_1, \ldots, \hat{X}_T$, where t=1, ..., T), $$\mathcal{Q} = [\hat{X}_1, \ldots, \hat{X}_T] \quad \text{[Formula 25]}$$

is formed. When calculating the inverse matrix of the matrix $\hat{X}_t$ by the equation (2), or equation (5) and equation (6) given above, this tensor is used for more efficient calculation of inverse matrices of matrices using SIMD commands.

The inverse matrix of the matrix $A_n$ is calculated similarly to the matrix $\hat{X}_t$. In this case, similarly to the above, a tensor of size M×M×N, containing N array elements of M×M matrices $A_n$ (i.e., $A_1, \ldots, A_N$, where n=1, ..., N), is formed as a data structure for utilizing SIMD commands. When calculating the inverse matrix of the matrix $A_n$ by the equation (3) given above, this tensor is used for more efficient calculation of inverse matrices of matrices using SIMD commands.

The signal separation device 10 according to the embodiment of the present invention can thus speed up the calculation of inverse matrices of matrices, as a result of which the time required for the calculation of inverse matrices of matrices can be reduced.

<Overall Configuration>

First, the overall configuration of the signal separation device 10 in the embodiment of the present invention will be described with reference to FIG. 1. FIG. 1 is a diagram illustrating an example of the overall configuration of the signal separation device 10 in the embodiment of the present invention.

As illustrated in FIG. 1, a signal separation program 100 that receives inputs of observed signals $x_t$ and outputs separated signals $y_{1t}, \ldots, y_{Nt}$ using an EM algorithm or MU algorithm is installed in the signal separation device 10 in the embodiment of the present invention. When obtaining separated signals $y_{1t}, \ldots, y_{Nt}$ from the observed signals $x_t$, the signal separation program 100 uses SIMD commands to calculate the inverse matrix of the matrix $\hat{X}_t$.

The signal separation program 100 may be configured by one program, or by a plurality of programs (or a program module). The separated signals $y_{1t}, \ldots, y_{Nt}$ may be output to any destination. For example, the separated signals $y_{1t}, \ldots, y_{Nt}$ may be output to another program, or another device, or to an auxiliary memory device 18 or the like to be described later.

<Hardware Configuration>

Figure 2:
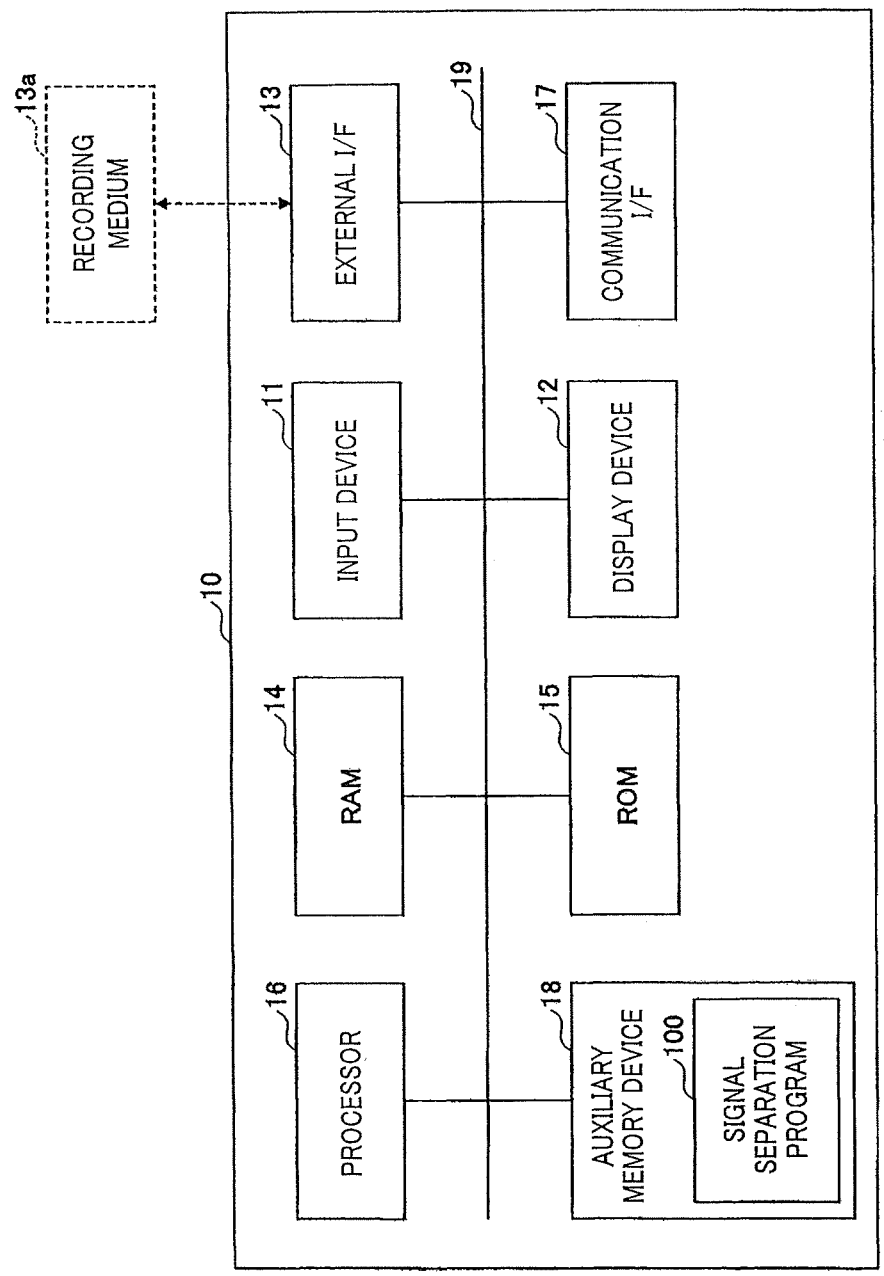
FIG. 2 is a diagram illustrating an example of a hardware configuration of the signal separation device in the embodiment of the present invention.

Next, a hardware configuration of the signal separation device 10 in the embodiment of the present invention will be described with reference to FIG. 2. FIG. 2 is a diagram illustrating an example of the hardware configuration of the signal separation device 10 in the embodiment of the present invention.

As illustrated in FIG. 2, the signal separation device 10 in the embodiment of the present invention includes an input device 11, a display device 12, an external I/F 13, a RAM (Random Access Memory) 14, a ROM (Read Only Memory) 15, a processor 16, a communication I/F 17, and an auxiliary memory device 18. These hardware components are connected to each other via buses 19 such as to be able to communicate with each other.

The input device 11 is a keyboard, mouse, touchscreen and the like, for example, and used by a user for inputting various operations. The display device 12 is a display and the like, for example, and shows processing results of the signal separation device 10. The signal separation device 10 may not have at least one of the input device 11 and the display device 12.

The external I/F 13 is an interface with external devices. The external device includes a recording medium 13a and the like. The signal separation device 10 can read or write data from or to the recording medium 13a via the external I/F 13. The recording medium 13a may also store the signal separation program 100 or the like.

The recording medium 13a includes, for example, a flexible disc, CD (Compact Disc), DVD (Digital Versatile Disk), SD memory card (Secure Digital Memory Card), USB (Universal Serial Bus) memory card, and so on.

RAM 14 is a volatile semiconductor memory for temporarily retaining programs and data. ROM 15 is a non-volatile semiconductor memory that can retain programs and data even when switched off. In the ROM 15, for example, settings information of the OS (operating System), settings information of communication networks, and the like, are stored.

The processor 16 is a CPU (Central Processing Unit) or GPU (Graphics Processing Unit) and the like, i.e., an operation device that reads programs and data from the ROM 15 or the auxiliary memory device 18 and the like to the RAM 14 and executes the processing. The processor 16 in the embodiment of the present invention is capable of executing parallel processing by SIMD commands. The signal separation device 10 may include both of a CPU and a GPU as the processor 16, or may include either one of a CPU and a GPU.

The communication I/F 17 is an interface for connecting the signal separation device 10 to a communication network. The signal separation program 100 may be obtained (downloaded) from a predetermined server device or the like via the communication I/F 17.

The auxiliary memory device 18 is an HDD (Hard Disk Drive) or an SSD (Solid State Drive) and the like, for example, which is a non-volatile memory device that stores therein programs and data. The programs and data stored in the auxiliary memory device 18 include an OS, various application programs, signal separation program 100, and so on.

The signal separation device 10 in the embodiment of the present invention can realize various processing steps by having the hardware configuration illustrated in FIG. 2. While FIG. 2 shows an example of the signal separation device 10 in the embodiment of the present invention described as being implemented by one device (computer), the configuration is not limited to this. The signal separation device 10 in the embodiment of the present invention may be implemented by a plurality of devices (computers). The signal separation device 10 in the embodiment of the present invention may also be implemented by a device (computer) equipped with a plurality of processors 16 and a plurality of memories (RAM 14, ROM 15, auxiliary memory device 18, etc.).

<Functional Configuration>

Next, a functional configuration of the signal separation device 10 in the embodiment of the present invention will be described.

(Functional Configuration when Using EM Algorithm)

Figure 3:
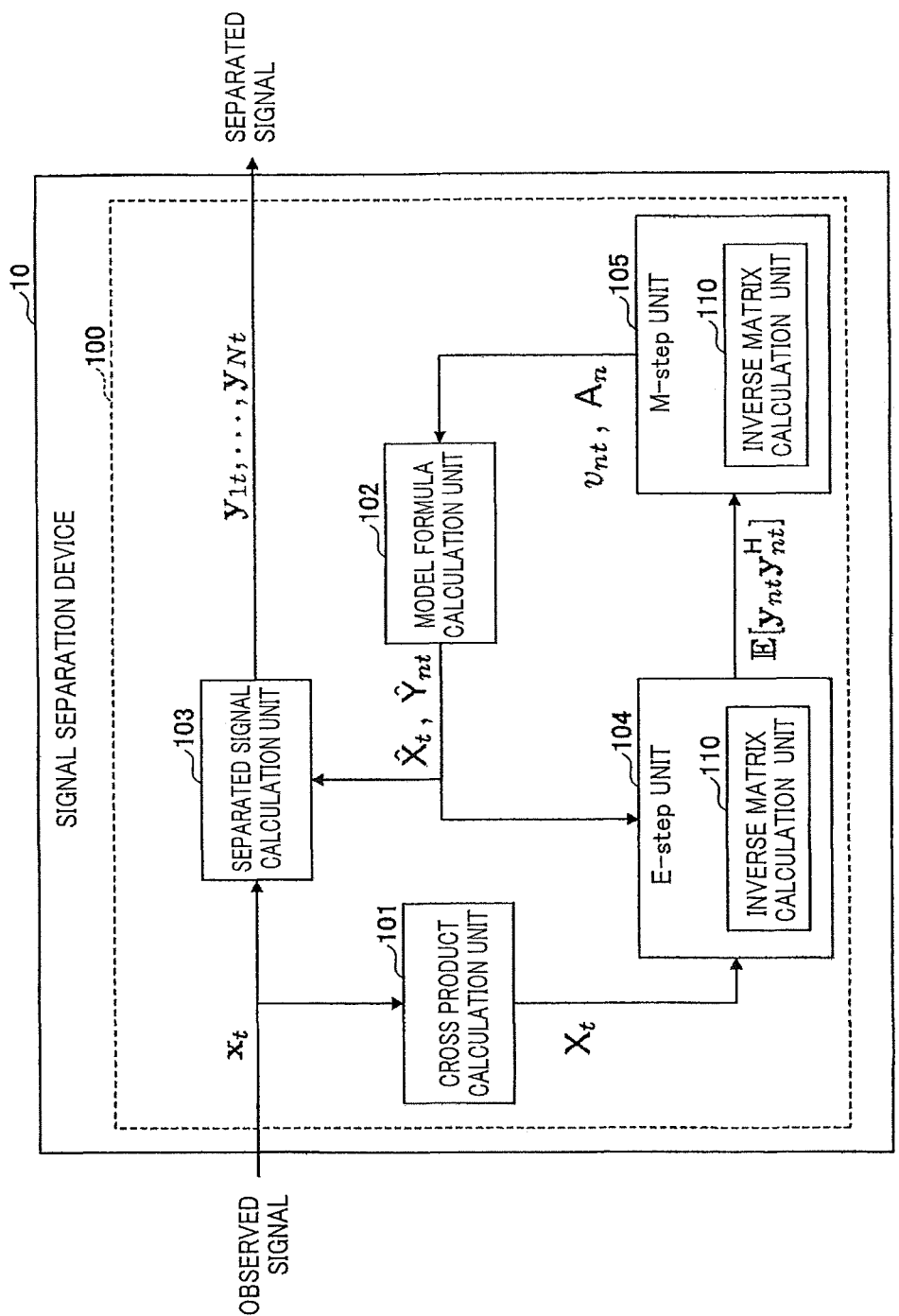
FIG. 3 is a diagram illustrating one (first) example of a functional configuration of the signal separation device in the embodiment of the present invention.

Below, a functional configuration when using an EM algorithm for estimation of parameters $A_n$ (n=1, ..., N) and $v_{nt}$ (n=1, ..., N, t=1, ..., T) in the full-rank spatial covariance model expressed by the equation (1) given above will be explained with reference to FIG. 3. FIG. 3 is a diagram illustrating one (first) example of the functional configuration of the signal separation device 10 in the embodiment of the present invention.

As illustrated in FIG. 3, the signal separation device 10 in the case in which it uses an EM algorithm includes a cross product calculation unit 101, a model formula calculation unit 102, a separated signal calculation unit 103, an E-step unit 104, and an M-step unit 105. These units are realized by the processing the signal separation program 100 causes the processor 16 to execute.

The cross product calculation unit 101 receives an input of an observed signal $x_t$ and calculates a cross product $X_t$. The model formula calculation unit 102 calculates the full-rank spatial covariance model expressed by the equation (1) given above by the EM algorithm. Namely, the model formula calculation unit 102 calculates $\hat{X}_t$ and $\hat{Y}_{nt}$ by estimating the parameters $A_n$ and $v_{nt}$ of the full-rank spatial covariance model expressed by the equation (1) given above by the EM algorithm.

The separated signal calculation unit 103 calculates the separated signal $y_{nt}$ by the equation (8) given above using $\hat{Y}_{nt}$, the inverse matrix of $\hat{X}_t$, and the observed signal $x_t$.

The E-step unit 104 executes an E-step of the EM algorithm. That is, the E-step unit 104 calculates the equation (2) given above.

The M-step unit 105 executes an M-step of the EM algorithm. Namely, the M-step unit 105 updates the parameters $A_n$ and $v_{nt}$ by the equation (3) and equation (4) given above.

Here, the E-step unit 104 and M-step unit 105 include an inverse matrix calculation unit 110. The inverse matrix calculation unit 110 calculates the inverse matrix of a matrix using an SIMD command. That is, the inverse matrix calculation unit 110 included in the E-step unit 104 calculates the inverse matrix of the matrix $\hat{X}_t$ when the equation (2) given above is calculated. Similarly, the inverse matrix calculation unit 110 included in the M-step unit 105 calculates the inverse matrix of the matrix $A_n$ when the parameter $v_{nt}$ is updated by the equation (3) given above.

(Functional Configuration when Using MU Algorithm)

Figure 4:
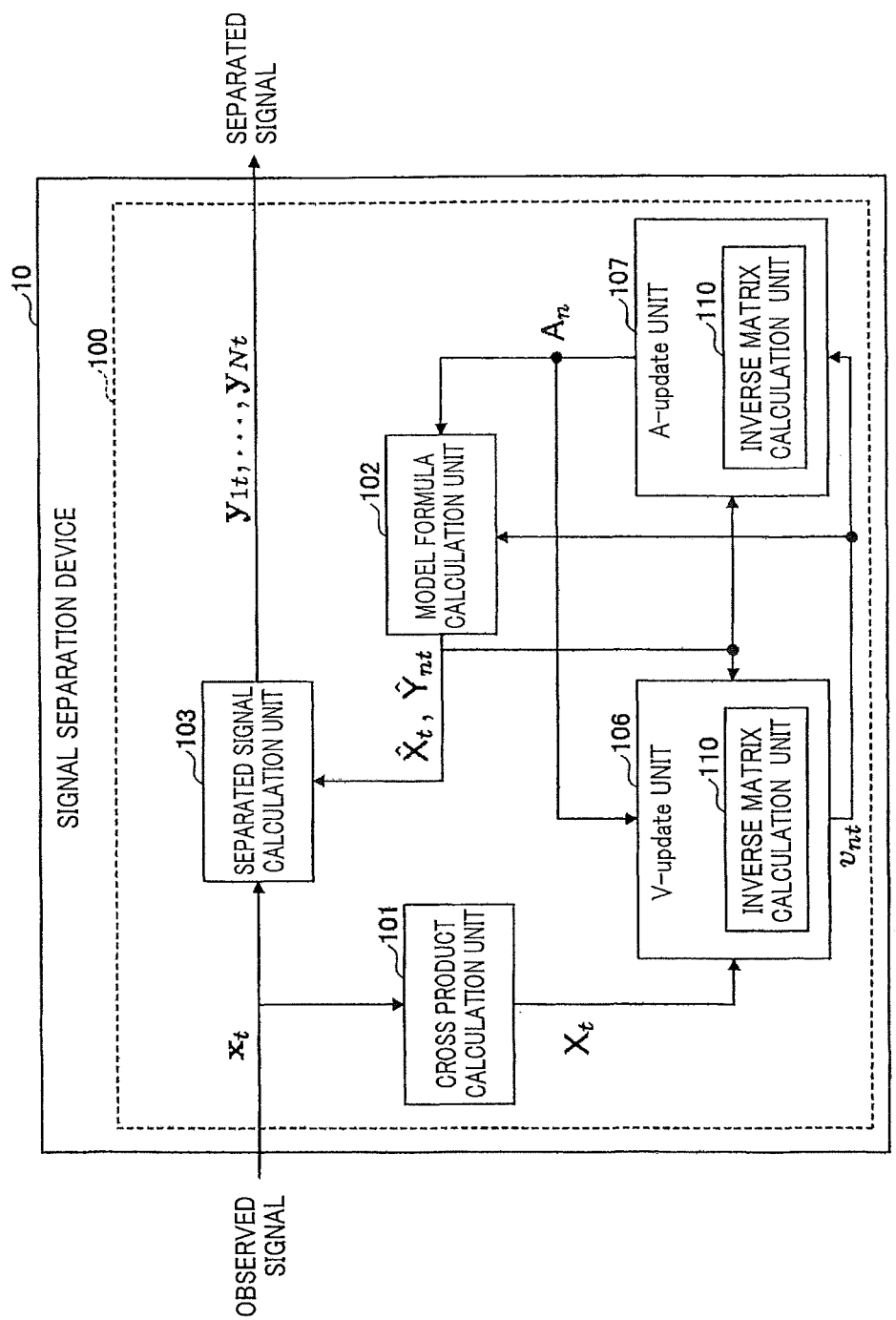
FIG. 4 is a diagram illustrating one (second) example of the functional configuration of the signal separation device in the embodiment of the present invention.

Below, a functional configuration when using an MU algorithm for estimation of parameters $A_n$ (n=1, . . . , N) and $v_{nt}$ (n=1, . . . , N, t=1, . . . , T) in the full-rank spatial covariance model expressed by the equation (1) given above will be explained with reference to FIG. 4. FIG. 4 is a diagram illustrating one (second) example of the functional configuration of the signal separation device 10 in the embodiment of the present invention.

As illustrated in FIG. 4, the signal separation device 10 in the case in which it uses an MU algorithm includes a cross product calculation unit 101, a model formula calculation unit 102, a separated signal calculation unit 103, a V-update unit 106, and an A-update unit 107. These units are realized by the processing the signal separation program 100 causes the processor 16 to execute.

The cross product calculation unit 101 receives an input of an observed signal $x_t$ and calculates a cross product $X_t$. The model formula calculation unit 102 calculates the full-rank spatial covariance model expressed by the equation (1) given above by the MU algorithm. Namely, the model formula calculation unit 102 calculates $\hat{X}_t$ and $\hat{Y}_{nt}$ by estimating the parameters $A_n$ and $v_{nt}$ of the full-rank spatial covariance model expressed by the equation (1) given above by the EM algorithm.

The separated signal calculation unit 103 calculates a separated signal $y_{nt}$ by the equation (8) given above using $\hat{Y}_{nt}$, the inverse matrix of $\hat{X}_t$, and observed signal $x_t$.

The V-update unit 106 executes a V-update of the MU algorithm. Namely, the V-update unit 106 updates the parameter $v_{nt}$ by the equation (5) given above.

The A-update unit 107 executes an A-update of the MU algorithm. Namely, the A-update unit 107 updates the parameter $A_n$ by calculating the equation (7) given above after calculating the equation (6) given above.

Here, the V-update unit 106 and A-update unit 107 include an inverse matrix calculation unit 110. The inverse matrix calculation unit 110 calculates the inverse matrix of a matrix using an SIMD command. Namely, the inverse matrix calculation unit 110 included in the V-update unit 106 calculates the inverse matrix of the matrix $\hat{X}_t$ when the parameter $v_{nt}$ is updated by the equation (5) given above. Similarly, the inverse matrix calculation unit 110 included in the A-update unit 107 calculates the inverse matrix of the matrix $\hat{X}_t$ when the equation (6) given above is calculated.

<Details of Processing>

Below, the processing that allows efficient calculation of inverse matrices of matrices using SIMD commands in the case in which blind signal separation is realized by an EM algorithm or an MU algorithm will be described. The example to be described in the embodiment of the present invention is the case in which the inverse matrix of the matrix $\hat{X}_t$ is calculated. The same applies to when calculating the inverse matrix of the matrix $A_n$, in which case t, T, and $\hat{X}_t$ should be read as n, N, and $A_n$, respectively, in the following description.

(Inverse Matrix Calculation Processing by Inverse Matrix Calculation Method 1)

Figure 5:
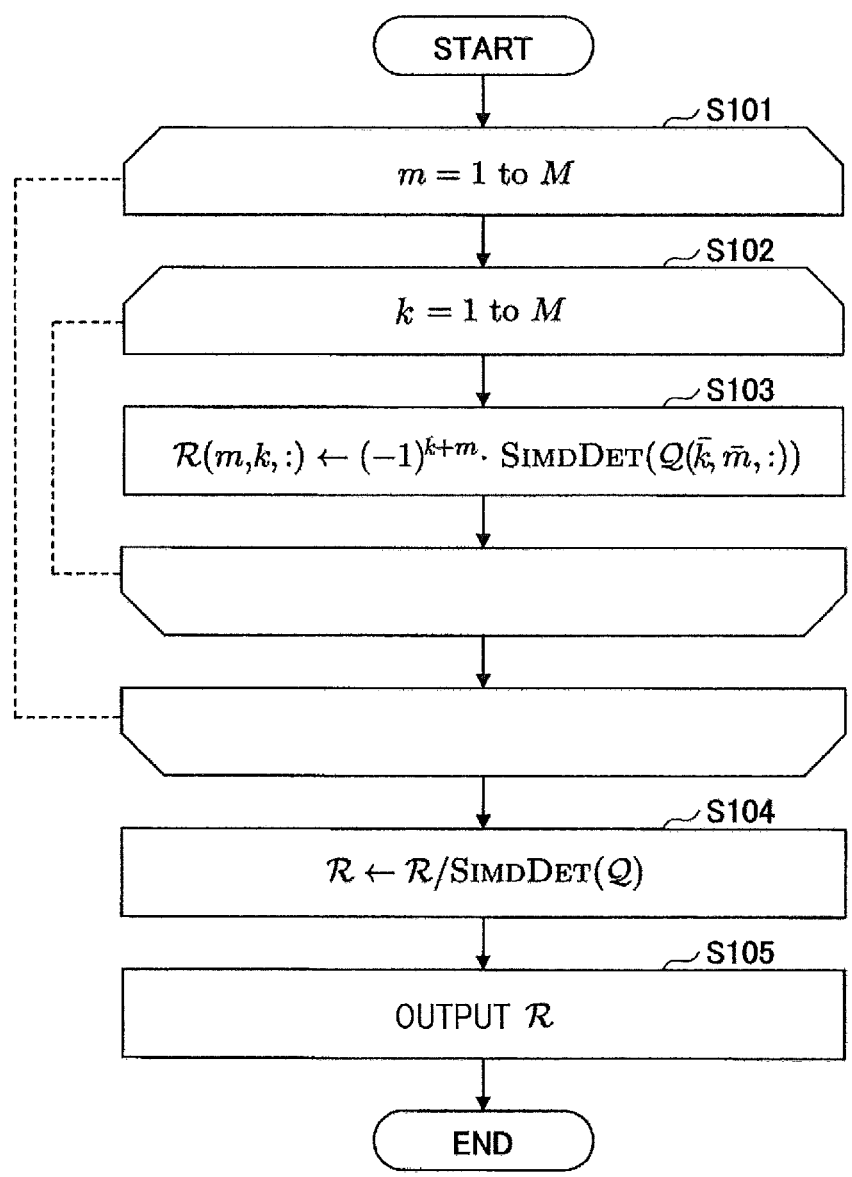
FIG. 5 is a flowchart illustrating one (first) example of inverse matrix calculation processing in the embodiment of the present invention.

The processing for calculating inverse matrices of matrices by Inverse Matrix Calculation Method 1 will be described with reference to FIG. 5. FIG. 5 is a flowchart illustrating one (first) example of processing for calculating inverse matrices of matrices in the embodiment of the present invention.

In FIG. 5, it is assumed that an M×M×T tensor including T array elements of matrices $\hat{X}_t$ $$\mathcal{Q} = [\hat{X}_1, \ldots, \hat{X}_T] \quad \text{[Formula 26]}$$

has been input. The processing result of the inverse matrix calculation is expressed as follows.

$$\mathcal{R} = [\hat{X}_1^{-1}, \ldots, \hat{X}_T^{-1}] \quad \text{[Formula 27]}$$

Namely, the inverse matrix calculation processing outputs an M×M×T tensor including T array elements of inverse matrices of matrices $\hat{X}_t$ as the result of processing.

Note, hereinbelow, the sum, product, and quotient (+, ·, /) of tensors shall mean element-wise calculation of sum, product, and quotient of tensors. Where tensor sizes do not match, broadcasting is performed as required. For example, when operating an M×M×T tensor and a 1×1×T tensor (to produce a sum, product, or quotient), the 1×1×T tensor is broadcast to the M×M×T tensor before the operation is carried out. The operation of these tensors is executed in parallel for each element by the SIMD command. This allows for efficient calculation of inverse matrices of matrices (in particular, efficient calculation of determinants for calculating inverse matrices of matrices).

The inverse matrix calculation unit 110 repeats execution of step S102 from m=1 to m=M (step S101). The inverse matrix calculation unit 110 also repeats execution of step S103 from k=1 to k=M (step S102).

At step S103 the inverse matrix calculation unit 110 calculates the following:

$$\mathcal{R}_{(m,k,:)} \leftarrow (-1)^{k+m} \cdot \text{SimDDet}(\mathcal{Q}_{(\bar{k},\bar{m},:)}) \quad \text{[Formula 28]}$$

Here, $$\mathcal{Q}_{(\bar{m},\bar{k},:)} \quad \text{[Formula 29]}$$

is a tensor having T array elements of (M−1)×(M−1) matrices obtained by deleting the m-th row and k-th column of the matrices $\hat{X}_t$.

$$\mathcal{R}_{(m,k,:)} \quad \text{[Formula 30]}$$

is a slice of the 1×1×T tensor, and an array of T elements (m, k) of the matrix inverse $\hat{X}_t^{-1}$.

Figure 6:
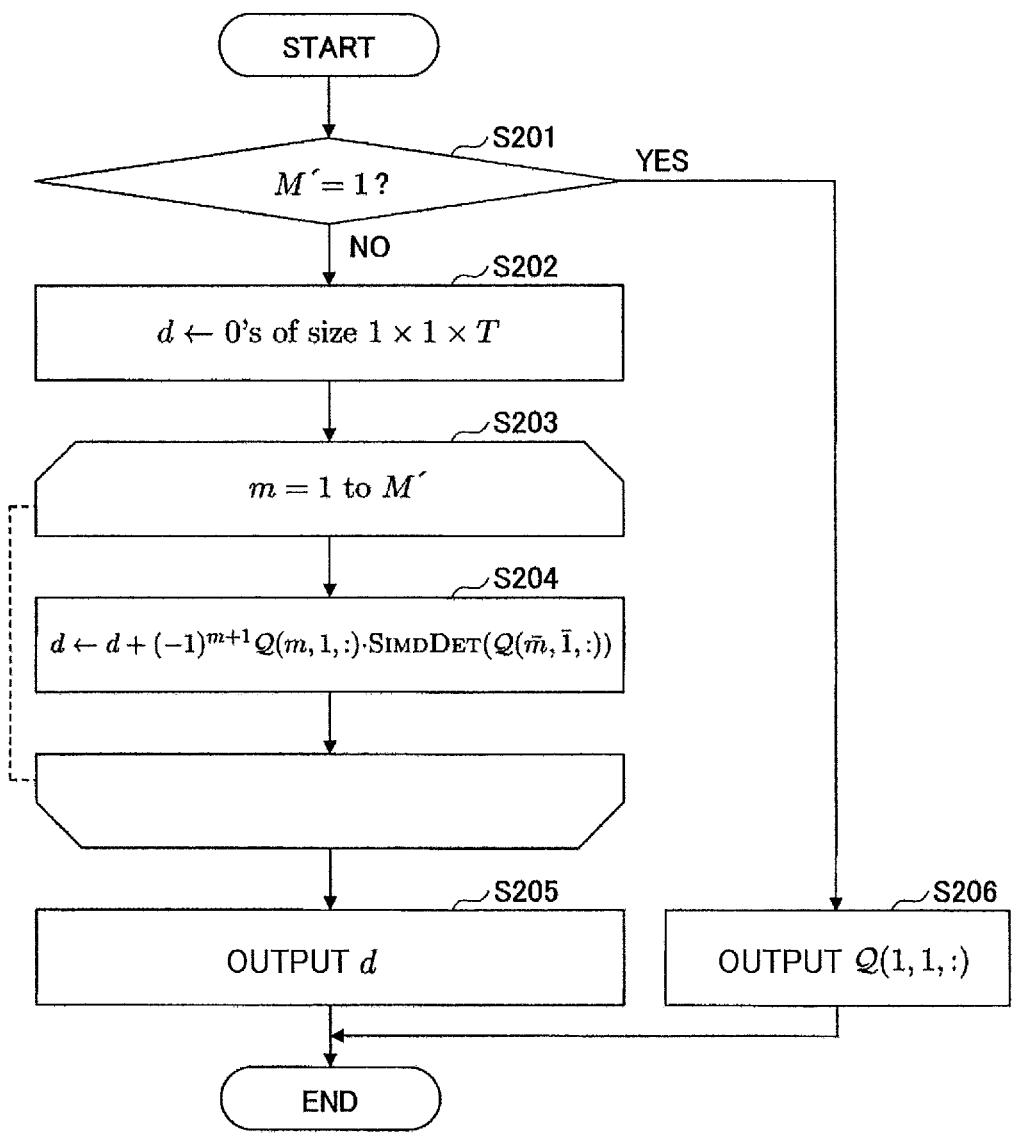
FIG. 6 is a flowchart illustrating one (first) example of determinant calculation processing using SIMD commands in the embodiment of the present invention.
Figure 7:
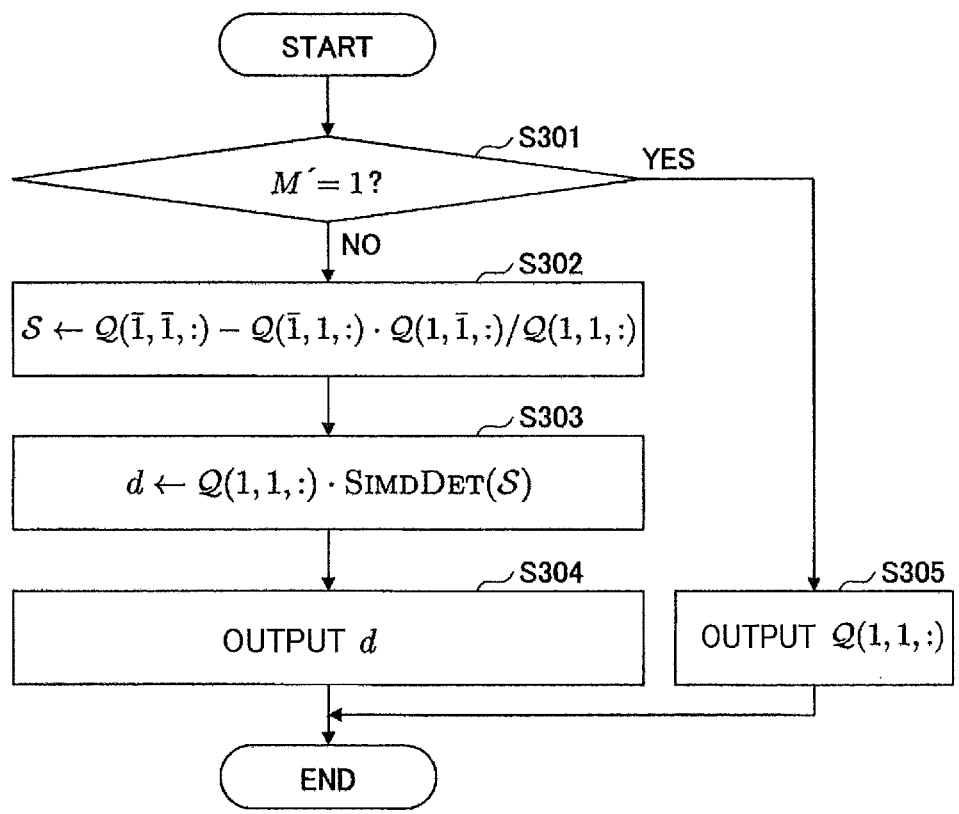
FIG. 7 is a flowchart illustrating one (second) example of determinant calculation processing using SIMD commands in the embodiment of the present invention.

Here, SIMDDET(•) is a function or method for calculating a determinant by an SIMD command and represents the invoking and execution of the determinant calculation processing using the SIMD command illustrated in FIG. 6 (or the determinant calculation processing using the SIMD command illustrated in FIG. 7). The output result of this SIMDDET is a 1×1×T tensor. The determinant calculation processing using SIMD commands will be described later.

Step S103 described above is executed from m=1 to m=M and from k=1 to k=M by repeating the step S101 described above and by repeating the step S102 described above.

After the repetition of the step S101 described above has ended, the inverse matrix calculation unit 110 calculates:

$$\mathcal{R} \leftarrow \mathcal{R} / \text{SimDDet}(\mathcal{Q}) \quad \text{[Formula 31]}$$

(step S104). The inverse matrix calculation unit 110 then outputs:

$$\mathcal{R} \quad \text{[Formula 32]}$$

(step S105). As a result, an M×M×T tensor including T array elements of matrix inverses $\hat{X}_t^{-1}$ is output as the result of the inverse matrix calculation processing.

(Determinant Calculation Processing Using SIMD Command (Determinant Calculation Method 1))

The processing for calculating determinants by Determinant Calculation Method 1 using SIMD commands for the processing invoked by SIMDDET(•) at the step S103 and step S104 described above will be described with reference to FIG. 6. FIG. 6 is a flowchart illustrating one (first) example of processing for calculating determinants using SIMD commands in the embodiment of the present invention. As mentioned above, this processing is invoked by SIMDDET(•). Here, the size of the tensor specified as the argument of SIMDDET(•) (i.e., tensor that is the input of the determinant calculation processing) is M'×M'×T in FIG. 6. In FIG. 6, $$\mathcal{Q}_{(m,k,:)} \quad \text{[Formula 33]}$$

is a slice of the 1×1×T size tensor, and an array of T elements (m, k) of the matrix $\hat{X}_t$.

First, the inverse matrix calculation unit 110 determines whether or not M'=1 (step S201). If M' is not 1, the inverse matrix calculation unit 110 initializes each element of 1×1×T tensor d to 0 (step S202). Next, the inverse matrix calculation unit 110 repeats execution of step S204 from m=1 to m=M' (step S203).

At step S204, the inverse matrix calculation unit 110 calculates:

$$d \leftarrow d + (-1)^{m+1} \mathcal{Q}_{(m,1,:)} \cdot \text{SimDDet}(\mathcal{Q}_{(\overline{m},\overline{1},:)}) \quad \text{[Formula 34]}$$

(step S204). Namely, the inverse matrix calculation unit 110 updates d by recursively executing SIMDDET(•) while diminishing the size (rows and columns) of the matrix $\hat{X}_t$ that forms the tensor input to SIMDDET(•) one by one.

When the repetition of the step S203 described above has ended, the inverse matrix calculation unit 110 outputs d (i.e., the result of the determinant calculation) (step S205).

If M'=1 at the step S201 described above, the inverse matrix calculation unit 110 outputs:

$$\mathcal{Q}_{(1,1,:)} \quad \text{[Formula 35]}$$

(step S206).

The determinant calculation processing that uses the SIMD command illustrated in FIG. 6 is recursively executed in this way until M'=1 while the size of the matrix $\hat{X}_t$ that forms the input tensor is diminished one by one. While the command is executed recursively until M'=1 in the embodiment of the present invention, the command may be executed recursively until M'=2, for example, for even higher speed. In this case, the processing result where M'=2 may be expressed as:

$$d = \mathcal{Q}_{(1,1,:)} \cdot \mathcal{Q}_{(2,2,:)} - \mathcal{Q}_{(1,2,:)} \cdot \mathcal{Q}_{(2,1,:)} \quad \text{[Formula 36]}$$

(Determinant Calculation Processing Using SIMD Command (Determinant Calculation Method 2))

Next, the processing for calculating determinants by Determinant Calculation Method 2 using SIMD commands for the processing invoked by SIMDDET(•) at the step S103 and step S104 described above will be described with reference to FIG. 7. FIG. 7 is a flowchart illustrating one (second) example of processing for calculating determinants using SIMD commands in the embodiment of the present invention. As mentioned above, this processing is invoked by SIMDDET(•). Here, the size of the tensor specified as the argument of SIMDDET(•) (i.e., tensor that is the input of the determinant calculation processing) is M'×M'×T in FIG. 7. In FIG. 6, $$\mathcal{Q}_{(\overline{1},1,:)} \quad \text{[Formula 37]}$$

is a slice of an (M−1)×1×T size tensor, and $$\mathcal{Q}_{(1,\overline{1},:)} \quad \text{[Formula 38]}$$

is a slice of a 1×(M−1)×T size tensor.

First, the inverse matrix calculation unit 110 determines whether or not M'=1 (step S301). If M' is not 1, the inverse matrix calculation unit 110 calculates:

$$\mathcal{S} \leftarrow \mathcal{Q}_{(\overline{1},\overline{1},:)} - \mathcal{Q}_{(\overline{1},1,:)} \cdot \mathcal{Q}_{(1,\overline{1},:)} / \mathcal{Q}_{(1,1,:)} \quad \text{[Formula 39]}$$

(step S302).

Next, the inverse matrix calculation unit 110 calculates:

$$d \leftarrow \mathcal{Q}_{(1,1,:)} \cdot \text{SimDDet}(\mathcal{S}) \quad \text{[Formula 40]}$$

(step S303). Namely, the inverse matrix calculation unit 110 calculates d by recursively executing SIMDDET(•) with:

$$\mathcal{S} \quad \text{[Formula 41]}$$

obtained at the step S302 described above as the argument (i.e., by recursively executing the determinant calculation processing using the SIMD command illustrated in FIG. 7).

The inverse matrix calculation unit 110 then outputs d (step S304). On the other hand, if M'=1 at the step S301 described above, the inverse matrix calculation unit 110 outputs:

$$\mathcal{Q}_{(1,1,:)} \quad \text{[Formula 42]}$$

(step S305).

The determinant calculation processing that uses the SIMD command illustrated in FIG. 7 is also recursively executed in this way until M'=1 while the size of the matrix $\hat{X}_t$ that forms the input tensor is diminished one by one. While the command is executed recursively until M'=1 in the embodiment of the present invention, the command may be executed recursively until M'=2, for example, for even higher speed, similarly to the determinant calculation processing using the SIMD command illustrated in FIG. 6.

In the processing for calculating inverse matrices of matrices by Inverse Matrix Calculation Method 1, whether to adopt the determinant calculation processing using the SIMD command illustrated in FIG. 6, or the determinant calculation processing using the SIMD command illustrated in FIG. 7, as a function or method (SIMDDET(•)) for calculating the determinant, can be determined or selected as required, for example in accordance with the size of the matrix.

(Inverse Matrix Calculation Processing by Inverse Matrix Calculation Method 2)

Figure 8:
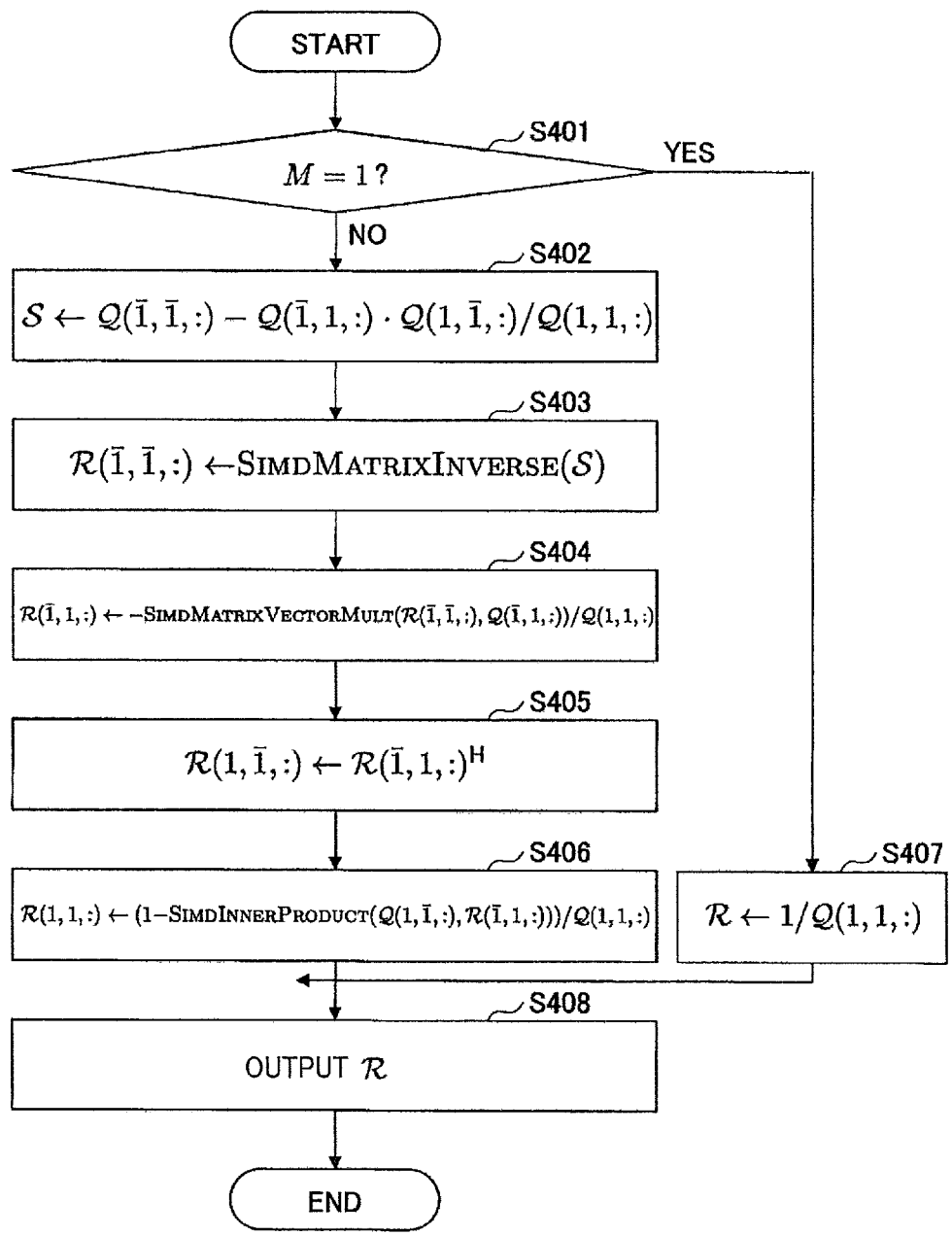
FIG. 8 is a flowchart illustrating one (second) example of inverse matrix calculation processing in the embodiment of the present invention.

Next, the processing for calculating inverse matrices of matrices by Inverse matrix calculation Method 2 will be described with reference to FIG. 8. FIG. 8 is a flowchart illustrating one (second) example of processing for calculating inverse matrices of matrices in the embodiment of the present invention. In the inverse matrix calculation processing illustrated in FIG. 8, unlike the inverse matrix calculation processing illustrated in FIG. 5, no determinant is calculated. Instead, in the inverse matrix calculation processing illustrated in FIG. 8, the product of a matrix and a vector is calculated using an SIMD command, and an inner product is calculated using an SIMD command. This allows for efficient calculation of inverse matrices of matrices.

In FIG. 8, similarly to FIG. 5, it is assumed that an M×M×T tensor including T array elements of $\hat{X}_t$ has been input. The function or method for invoking the inverse matrix calculation processing illustrated in FIG. 8 is expressed as SIMDMATRIXINVERSE(•).

Hereinbelow, similarly to the "Inverse Matrix Calculation Processing by Inverse Matrix Calculation Method 1", the sum, product, and quotient (+, ·, /) of tensors shall mean element-wise calculation of sum, product, and quotient of tensors. Where tensor sizes do not match, broadcasting is performed as required. The operation of these tensors is executed in parallel for each element by the SIMD command. This allows for efficient calculation of inverse matrices of matrices (in particular, efficient calculation of products and inner products of matrices and vectors for calculating inverse matrices of matrices).

First, the inverse matrix calculation unit 110 determines whether or not M=1 (step S401). If M is not 1, the inverse matrix calculation unit 110 calculates:

$$\mathcal{S} \leftarrow \mathcal{Q}_{(\bar{1},\bar{1},:)} - \mathcal{Q}_{(\bar{1},1,:)} \cdot \mathcal{Q}_{(1,\bar{1},:)} / \mathcal{Q}_{(1,1,:)} \quad \text{[Formula 43]}$$

(step S402).

Next, the inverse matrix calculation unit 110 calculates:

$$\mathcal{R}_{(\bar{1},\bar{1},:)} \leftarrow \text{SimdMatrixInverse}(\mathcal{S}) \quad \text{[Formula 44]}$$

Figure 9:
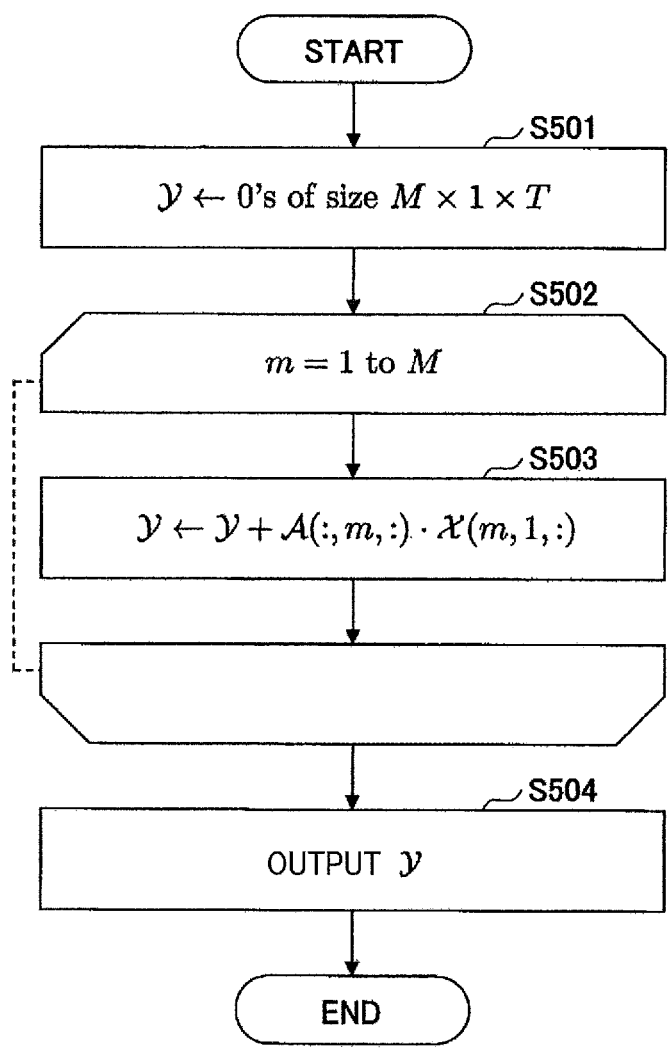
FIG. 9 is a flowchart illustrating one example of processing for calculating a product of a matrix and a vector in the embodiment of the present invention.

(step S403). Namely, the inverse matrix calculation unit 110 recursively executes SIMDMATRIXINVERSE(•) with:

$$\mathcal{S} \quad \text{[Formula 45]}$$

obtained at the step S402 described above as the argument (i.e., recursively executes the inverse matrix calculation processing illustrated in FIG. 9).

Next, the inverse matrix calculation unit 110 calculates:

$$\mathcal{R}_{(\bar{1},1,:)} \leftarrow -\text{SimdMatrixVectorMult}(\mathcal{R}_{(\bar{1},\bar{1},:)}, \mathcal{Q}_{(\bar{1},1,:)}) / \mathcal{Q}_{(1,1,:)} \quad \text{[Formula 46]}$$

(step S404).

Here, SIMDMATRIXVECTORMULT(•,•) is a function or method for calculating a product of a matrix and a vector by an SIMD command and represents the invoking and execution of the processing for calculating the product of the matrix and vector illustrated in FIG. 9. The processing for calculating products of matrices and vectors will be described later.

Next, the inverse matrix calculation unit 110 calculates:

$$\mathcal{R}_{(1,\bar{1},:)} \leftarrow \mathcal{R}_{(\bar{1},1,:)}^H \quad \text{[Formula 47]}$$

(step S405).

Next, the inverse matrix calculation unit 110 calculates:

$$\mathcal{R}_{(1,1,:)} \leftarrow (1 - \text{SimdInnerProduct}(\mathcal{Q}_{(1,\bar{1},:)}, \mathcal{R}_{(\bar{1},1,:)})) / \mathcal{Q}_{(1,1,:)} \quad \text{[Formula 48]}$$

(step S406).

Figure 10:
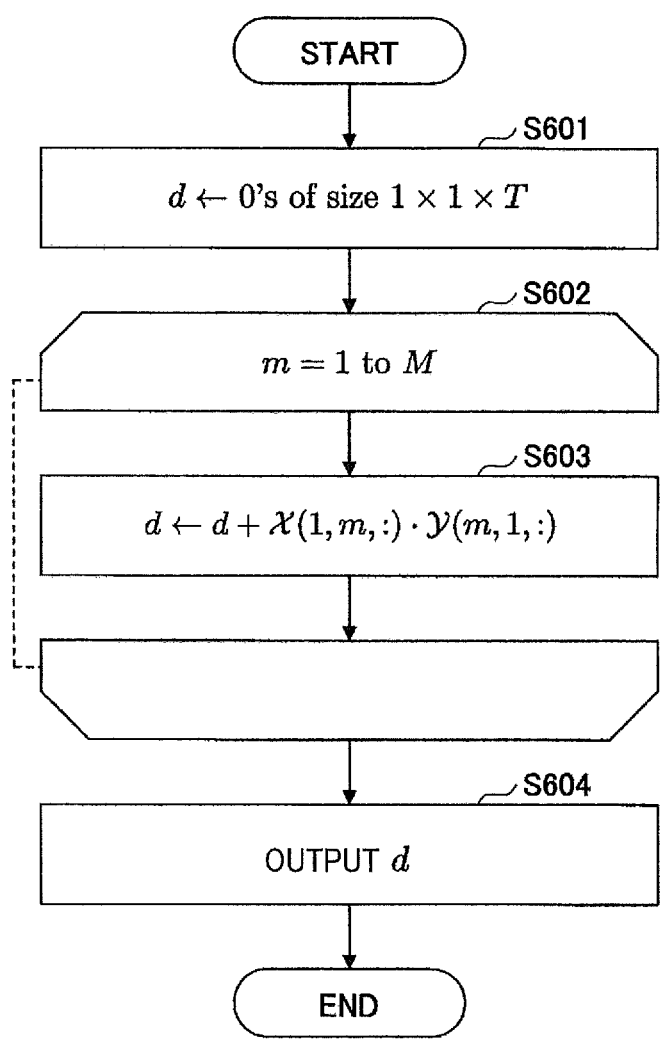
FIG. 10 is a flowchart illustrating one example of processing for calculating an inner product in the embodiment of the present invention.

Here, SIMDINNERPRODUCT(•,•) is a function or method for calculating an inner product by an SIMD command and represents the invoking and execution of the processing for calculating the inner product illustrated in FIG. 10. The processing for calculating inner products will be described later.

On the other hand, if M=1 at the step S401 described above, the inverse matrix calculation unit 110 calculates:

$$\mathcal{R} \leftarrow 1 / \mathcal{Q}_{(1,1,:)} \quad \text{[Formula 49]}$$

(step S407).

Following step S406 or step S407, the inverse matrix calculation unit 110 then outputs:

$$\mathcal{R} \quad \text{[Formula 50]}$$

(step S408). As a result, an M×M×T tensor including T array elements of inverse matrix $\hat{X}_t^{-1}$ is output as the result of the inverse matrix calculation processing.

(Processing for Calculating Product of Matrix and Vector Using SIMD Command)

Next, the processing invoked by SIMDMATRIXVECTORMULT(•,•) in the step S404 described above in which products of matrices and vectors are calculated using SIMD commands will be described with reference to FIG. 9. FIG. 9 is a flowchart illustrating one example of processing for calculating products of matrices and vectors using SIMD commands in the embodiment of the present invention. As mentioned above, this processing is invoked by SIMDMATRIXVECTORMULT(•,•). Referring to FIG. 9, one case where $A$: Size $M \times M \times T$ tensor $X$: Size $M \times 1 \times T$ tensor [Formula 51]

$$\text{SimdMatrixVectorMult}(\mathcal{A}, \mathcal{X}) \quad \text{[Formula 52]}$$

is invoked will be described.

First, the inverse matrix calculation unit 110 initializes each element of the M×1×T tensor to 0:

$$\mathcal{Y} \leftarrow 0\text{'s of size } M \times 1 \times T \quad \text{[Formula 53]}$$

(step S501).

Next, the inverse matrix calculation unit 110 repeats execution of step S503 from m=1 to m=M (step S502).

At step S503, the inverse matrix calculation unit 110 calculates:

$$\mathcal{Y} \leftarrow \mathcal{Y} + \mathcal{A}_{(:,m,:)} \cdot \mathcal{X}_{(m,1,:)} \quad \text{[Formula 54]}$$

where $$\mathcal{A}_{(:,m,:)} \quad \text{[Formula 55]}$$

is an M×1×T tensor, and $$\mathcal{X}_{(m,1,:)} \quad \text{[Formula 56]}$$

is a 1×1×T tensor. Therefore, $$\mathcal{A}_{(:,m,:)} \cdot \mathcal{X}_{(m,1,:)} \quad \text{[Formula 57]}$$

is an M×1×T tensor.

The inverse matrix calculation unit 110 then outputs:

$$\mathcal{Y} \quad \text{[Formula 58]}$$

(step S504).

(Processing for Calculating Inner Product Using SIMD Command)

Next, the processing invoked by SIMDINNERPRODUCT(•,•) in the step S406 described above in which inner products of matrices and vectors are calculated using SIMD commands will be described with reference to FIG. 10. FIG. 10 is a flowchart illustrating one example of processing for calculating inner products in the embodiment of the present invention. As mentioned above, this processing is invoked by SIMDINNERPRODUCT(•,•). Referring to FIG. 10, one case where $X$: Size $M \times 1 \times T$ tensor $Y$: Size $M \times 1 \times T$ tensor [Formula 59]

$$\text{SimdInnerProduct}(\mathcal{X}, \mathcal{Y}) \quad \text{[Formula 60]}$$

is invoked will be described.

First, the inverse matrix calculation unit 110 initializes each element of 1×1×T tensor d to 0 (step S601).

Next, the inverse matrix calculation unit 110 repeats execution of step S603 from m=1 to m=M (step S602).

At step S603, the inverse matrix calculation unit 110 calculates:

$$d \leftarrow d + \mathcal{X}_{(1,m,:)} \cdot \mathcal{Y}_{(m,1,:)} \quad \text{[Formula 61]}$$

The inverse matrix calculation unit 110 then outputs d (step S604).

Effects of the Embodiment of the Present Invention

Lastly, to demonstrate the effects of the embodiment of the present invention, an experiment was performed in which sounds mixed in space (speech signals) were separated. The source signals were four voices, and observed signals were mixed sounds of all the voices speaking for six seconds, which were acquired using two to five microphones as sensors.

Table 1 below shows the execution time (seconds) required for the repetition of the EM algorithm, where "CPU (prior art)" represents a case where inverse matrices of matrices were calculated by an existing method without using SIMD commands, "CPU (SIMD1)" represents a case where inverse matrices of matrices were calculated by Inverse Matrix Calculation Method 1 using SIMD commands of the CPU, "CPU (SIMD2)" represents a case where inverse matrices of matrices were calculated by Inverse Matrix Calculation Method 2 using SIMD commands of the CPU, "GPU (SIMD1)" represents a case where inverse matrices of matrices were calculated by Inverse Matrix Calculation Method 1 using not only the CPU but also a GPU, and "GPU (SIMD2)" represents a case where inverse matrices of matrices were calculated by Inverse Matrix Calculation Method 2 using not only the CPU but also the GPU. Both the CPU and the GPU used here are the same ones.

TABLE 1

| | GPU (SIMD1) | CPU (SIMD1) | GPU (SIMD2) | CPU (SIMD2) | CPU (Prior Art) |
|---|---|---|---|---|---|
| 20 times repetition | 3.2 | 19.0 | 4.2 | 18.3 | 33.9 |
| 100 times repetition | 7.5 | 93.0 | 7.2 | 88.9 | 165.4 |

As indicated in Table 1, the CPU (prior art) took 33.9 seconds and 165.4 seconds for twenty times repetition and a hundred times repetition, respectively, whereas CPU (SIMD1) took 19.5 seconds and 93.0 seconds for twenty times repetition and a hundred times repetition, respectively, and CPU (SIMD2) took 18.3 seconds and 88.9 seconds for twenty times repetition and a hundred times repetition, respectively, i.e., the execution time was reduced. Also, the GPU (SIMD1) took 3.2 seconds and 7.5 seconds for twenty times repetition and a hundred times repetition, respectively, and GPU (SIMD2) took 4.2 seconds and 7.2 seconds for twenty times repetition and a hundred times repetition, respectively, i.e., the execution time was reduced even more.

The measured SDR (Signal-to-Distortion Ratio) that indicates the speech separation performance was 8.03 dB and 10.36 dB for twenty times repetition and a hundred times repetition, respectively, for all of the CPU (prior art), CPU (SIMD1), and GPU (SIMD1).

The following Table 2 shows the execution time when the number M of sensors was varied from 2 to 5.

TABLE 2

| | GPU (SIMD1) | CPU (SIMD1) | GPU (SIMD2) | CPU (SIMD2) | CPU (Prior Art) |
|---|---|---|---|---|---|
| M = 2 | 5.2 | 34.4 | 4.2 | 33.8 | 99.7 |
| M = 3 | 7.5 | 93.0 | 7.2 | 88.9 | 165.4 |
| M = 4 | 12.6 | 209.9 | 11.2 | 179.2 | 262.9 |
| M = 5 | 20.7 | 434.7 | 17.0 | 316.9 | 410.9 |

With Inverse Matrix Calculation Method 1, in particular in the case with the CPU (i.e., CPU (SIMD1)), the execution time was increased. When M=5, CPU (SIMD1) took more execution time than CPU (prior art). On the other hand, with Inverse Matrix Calculation Method 2, the execution time increased with the increase in M to a lesser extent. With the use of the GPU, the operation speed was largely increased in both cases with Inverse Matrix Calculation Method 1 and Method 2.

As demonstrated above, according to the embodiment of the present invention, the execution time can be largely reduced as compared to the existing technique, which leads to improvement of the actual separation performance.

The present invention is not limited to the specific disclosure of the embodiment described above and can be modified and changed in various ways without departing from the described scope of the claims.

This application claims the benefit of Japanese Patent Application No. 2018-212408 filed on Nov. 12, 2018 in Japan, which is incorporated by reference herein in its entirety.

REFERENCE SIGNS LIST

10 Signal separation device
100 Signal separation program
101 Cross product calculation unit
102 Model formula calculation unit
103 Separated signal calculation unit
104 E-step unit
105 M-step unit
106 V-update unit
107 A-update unit
110 Inverse matrix calculation unit

The invention claimed is:

1. A signal separation device comprising:
one or more memories; and
one or more processors coupled to the one or more memories and configured to:
receive an input of an observed signal that is a mixture of a plurality of target signals, and calculate a cross product of the observed signal;
update a parameter of a model for estimating the cross product with a predetermined algorithm using an inverse matrix of a matrix that represents an estimate of the cross product;
calculate the inverse matrix of a matrix by an SIMD command when the parameter is updated; and
calculate the target signals using a matrix representing an estimate of the cross product, the updated parameter, and the observed signal.

2. The signal separation device according to claim 1, wherein the one or more processors are further configured to
calculate the cross product for each discrete time $t=1, \ldots, T$ at which the observed signal is observed,
update a parameter of a model for estimating a cross product for each of the discrete time t with the algorithm using inverse matrices of matrices that each represent an estimate of a cross product for each of the discrete time t, and
calculate a tensor formed by the inverse matrices of matrices by the SIMD command using a tensor formed by matrices each representing an estimate of a cross product for each of the discrete time t when the parameter is updated.

3. The signal separation device according to claim 2, wherein the one or more processors are further configured to recursively calculate determinants of matrices each representing an estimate of a cross product for each of the discrete time t by the SIMD command, and calculate a tensor formed by the inverse matrices of matrices using calculated determinants.

4. The signal separation device according to claim 3, wherein the one or more processors are further configured to recursively calculate determinants of matrices each representing an estimate of a cross product for each of the discrete time t, by using the SIMD command, in accordance with a relationship between a determinant of a block matrix and a scalar, a vector, and a determinant of a matrix that form the block matrix.

5. The signal separation device according to claim 2, wherein the one or more processors are further configured to recursively calculate inverse matrices of matrices each representing an estimate of a cross product for each of the discrete time t, by using the SIMD command, in accordance with a relationship between a determinant of a block matrix and a scalar, a vector, and a determinant of a matrix that form the block matrix.

6. The signal separation device according to claim 1, wherein the parameter includes a spatial covariance matrix that represents relative transfer from signal sources of the target signals to sensors that observe the observed signal, and the one or more processors are further configured to calculate an inverse matrices of the spatial covariance matrix by the SIMD command when the parameter is updated.

7. The signal separation device according to claim 1, wherein the algorithm is an EM algorithm or an MU algorithm.

8. A signal separation method executed by a computer, comprising:
   receiving an input of an observed signal that is a mixture of a plurality of target signals, and calculating a cross product of the observed signal;
   updating a parameter of a model for estimating the cross product with a predetermined algorithm using an inverse matrix of a matrix that represents an estimate of the cross product;
   calculating the inverse matrix of a matrix by a SIMD command when the parameter is updated; and
   calculating the target signals using a matrix representing an estimate of the cross product, the updated parameter, and the observed signal.

9. A non-transitory computer readable medium having a program embodied therein for causing a computer to perform the method of claim 8.

* * * * *